United States Patent [19]
Bleider et al.

[11] Patent Number: 5,613,708
[45] Date of Patent: Mar. 25, 1997

[54] COLLISION PROTECTION DEVICE, IN PARTICULAR FOR OCCUPANTS OF VEHICLES

[75] Inventors: Alexander Bleider, Hildesheim; Michael Gumprecht, Schellerten; Manfred Wirries, Hildesheim, all of Germany

[73] Assignee: Phoenix Airbag GmbH, Hildesheim, Germany

[21] Appl. No.: 360,723

[22] PCT Filed: Apr. 14, 1994

[86] PCT No.: PCT/DE94/00413

§ 371 Date: Dec. 13, 1994

§ 102(e) Date: Dec. 13, 1994

[87] PCT Pub. No.: WO94/23972

PCT Pub. Date: Oct. 27, 1994

[30] Foreign Application Priority Data

Apr. 17, 1993 [DE] Germany .......................... 43 12 578.6

[51] Int. Cl.⁶ .................................................. B60R 21/16
[52] U.S. Cl. .................................... 280/743.2; 280/743.1
[58] Field of Search ............................ 280/743 A, 743 R, 280/728 R, 743.2, 743.1, 728.1

[56] References Cited

U.S. PATENT DOCUMENTS

| | | | |
|---|---|---|---|
| 3,879,056 | 4/1975 | Kawashima et al. | 280/743 A |
| 4,828,286 | 5/1989 | Fohl | 280/743 R |
| 5,033,771 | 7/1991 | Miyauchi et al. | |
| 5,186,489 | 2/1993 | Imai | 280/743 A |
| 5,226,671 | 7/1993 | Hill | 280/743 R |
| 5,316,337 | 5/1994 | Yamaji et al. | 280/728 R |
| 5,393,092 | 2/1995 | Charns et al. | 280/743 R |

FOREIGN PATENT DOCUMENTS

| | | | |
|---|---|---|---|
| 2646328 | 11/1990 | France . | |
| 1120853 | 12/1961 | Germany . | |
| 5116575 | 5/1993 | Japan | 280/743 R |
| 5221278 | 8/1993 | Japan | 280/743 R |
| 9301955 | 2/1993 | WIPO | 280/728 R |

Primary Examiner—Brian L. Johnson
Assistant Examiner—Peter C. English
Attorney, Agent, or Firm—Collard & Roe, P.C.

[57] ABSTRACT

A collision protection device, in particular for occupants of vehicles, particularly of motor vehicles, includes a cushion of covering cap, an airbag, a fastening part (e.g. metal holding sheet), electronic or mechanical devices, and a gas generator, whereby the airbag made of fabric (e.g. polyamide fabric) with or without a coating, in turn has a fastening part on the gas inflow side. This fastening part is equipped with a fire protection, if need be; a top part (person impact side), and catch belts, whereby the ends of the catch belts are connected with other construction components or with each other (joints). The catch belts or other construction components of the airbag have a perforation namely within the zone of the respective joints.

3 Claims, 5 Drawing Sheets

FIG. 2a
FIG. 2b
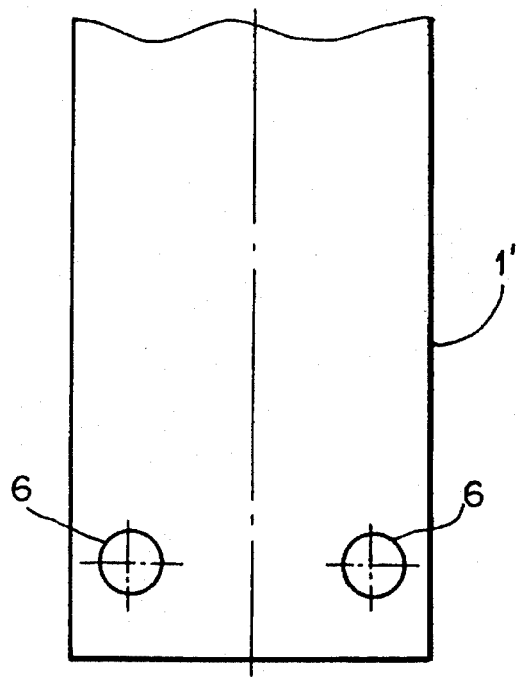
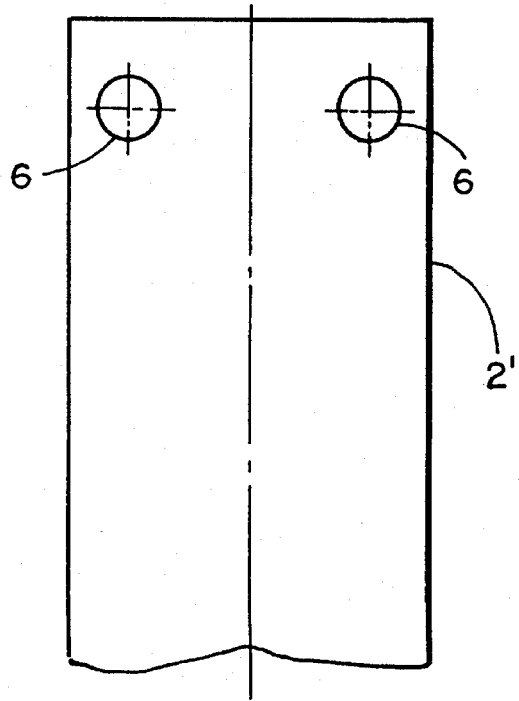
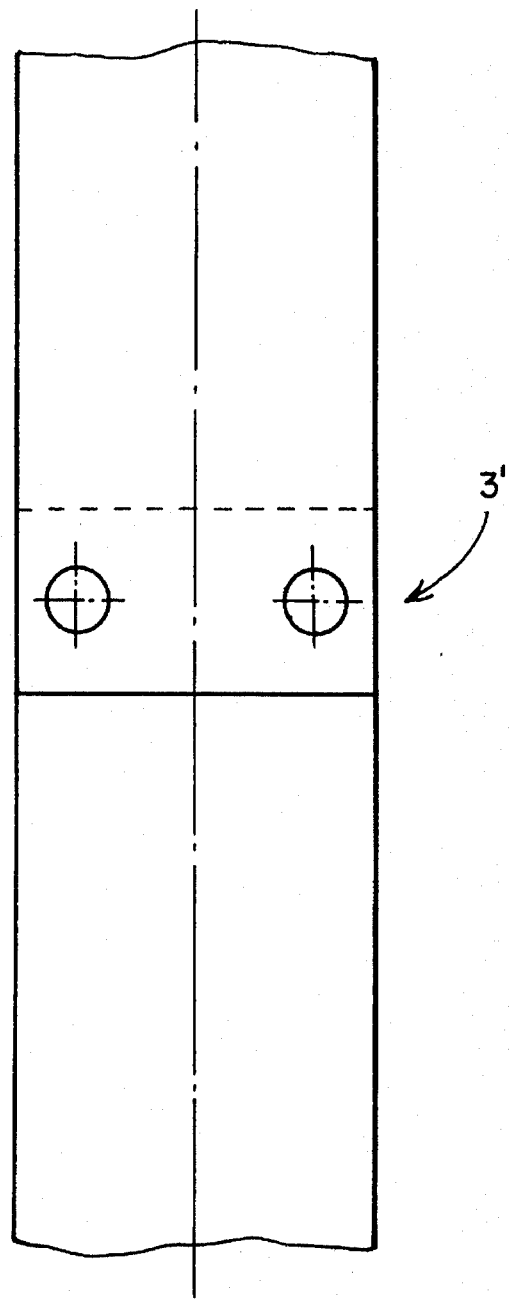

COLLISION PROTECTION DEVICE, IN PARTICULAR FOR OCCUPANTS OF VEHICLES

BACKGROUND OF THE INVENTION

1. Field of the Invention

The invention relates to a collision protection device, in particular for occupants of vehicles, particularly of motor vehicles, consisting to a cushion or covering cap, an airbag, a fastening part (e.g. metal holding sheet), electronic or mechanical devices, and a gas generator, whereby the airbag, which is made of fabric (e.g. polyamide fabric) with or without a coating, in turn consists of a fastening part on the gas inflow side, such part being equipped with a fire protection, if need be, a top part (on the person impact side), and catch belts, whereby the ends of the catch belts are connected with other construction components or with each other (joints).

2. The Prior Art

Airbags for the airbag system in motor vehicles according to the state of the art frequently have catch belts, which influence both the unfolding behavior and the shape of the airbag in the inflated condition to the extent that a flattening in the direction of the vehicle occupant to be protected enhances the intended protective function for such occupant. This particularly applies to a special degree also in case of a laterally offset vehicle collision. Known designs of such airbags have one or several catch belt(s) (U.S. Pat. No. 5,033,771).

It is known that the catch belts, for production engineering reasons, can be divided, and thus have to be connected again across their free length by suitable joining methods. Furthermore, it is known that the catch belts are connected at their ends with other construction components (e.g. fire protection, reinforcing inserts; U.S. Pat. No. 5,186,489) of the airbag.

In order to connect the catch belts at their free ends with each other or with other construction components of the airbag with exact positioning and process safety, an exact positioning and fixation of the catch belt ends, as well as of the other construction components relative to each other, is absolutely required prior to the joining process.

SUMMARY OF THE INVENTION

Now, according to the characterizing part of claim 1 or 2, the solution of the above problem consists in that the catch belts or other construction components of the airbag have a perforation (variation I) or on their outer edges one or several projection(s) and/or one or several recess(es)(variation II), namely in each case within the zone of the joints.

According to variation I, the perforation can consist of one or several holes, whereby such holes are usefully circular and/or polygonal. It is particularly advantageous if the perforation or the holes are positioned in such a way that they impair the strength of the catch belts or of the other construction components as well as the transmission of force to the lowest possible degree.

According to variation II, the projections or recesses have round and/or polygonal shapes. In this case too, the projections and/or recesses are usefully positioned and formed in such a way that they impair the strength of the catch belts or of the other construction components, as well as the transmission of force to the lowest possible extent.

BRIEF DESCRIPTION OF THE DRAWINGS

Now, the invention is explained in the following on exemplified embodiments by reference to schematic drawings, in which:

FIGS. 2a, b show a catch belt connection with a perforation, whereby FIG. 2a shows the free catch belt ends, which are connected with each other in FIG. 2b; FIG. 3a shows the free catch belt ends, which are connected with each other in FIG. 3b; FIG. 4a shows the free catch belt ends, which are connected with each other in FIG. 4b; FIG. 5a shows the free catch belt ends, which are connected with each other in FIG. 5b.

Figure 1:
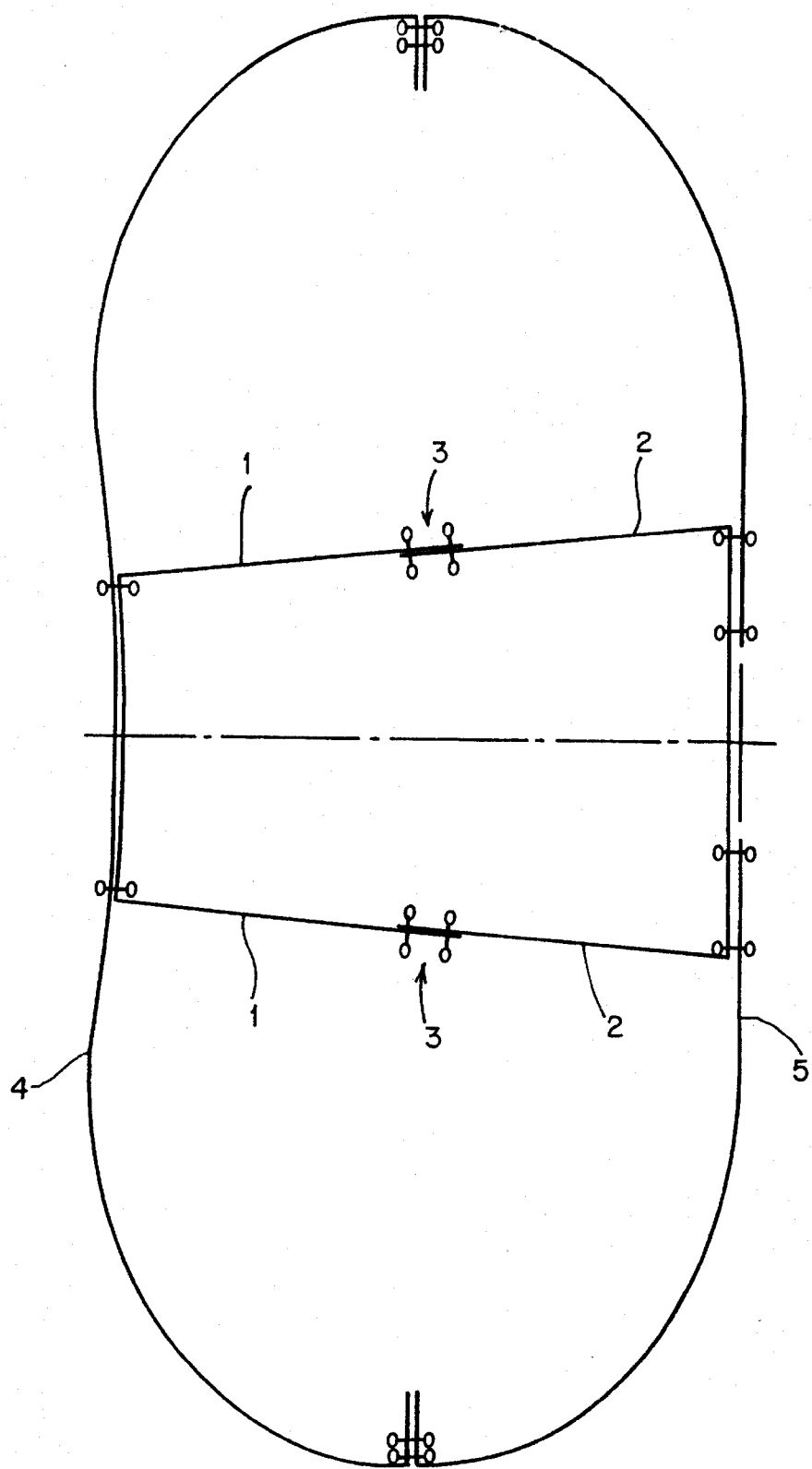
FIG. 1 shows a schematic sectional representation of an airbag consisting of a top part and a bottom part, catch belts and their joints.

The following list of reference numerals applies in view of said figures:

| | |
|---|---|
| 1 | Catch belt |
| 1' | Catch belt end |
| 1" | Catch belt end |
| 2 | Catch belt |
| 2' | Catch belt end |
| 2" | Catch belt end |
| 3 | Joint |
| 3' | Joint |
| 3" | Joint |
| 4 | Top part (person impact side) |
| 5 | Bottom part (fastening part on the gas inflow side) |
| 6 | Perforation |
| 7 | Projection |
| 8 | Recess |

DETAILED DESCRIPTION OF PREFERRED EMBODIMENTS

A first embodiment of the collision protection device, (see FIGS. 1 and 2a, 2b) in particular for occupants of vehicles, particularly of motor vehicles, includes (a) a cushion or covering cap, an airbag, a fastening part, electronic or mechanical devices, and a gas generator, whereby (b) the airbag, the latter being made of fabric with or without a coating, consists of a fastening part on the gas inflow side, which part may be equipped with a fire protection, if need be; a top part (person impact side) and catch belts, (c) whereby the ends of the catch belts are connected with other construction parts or with each other (joints), characterized in that (d) the catch belts (1, 1', 2, 2') or other construction components of the airbag have a perforation (6), namely within the zone of the joints (3, 3').

In the collision protection device, the perforation consists of one or several hole(s). Preferably, the holes are circular and/or polygonal. Also the perforation or the holes are positioned in a way such that they impair the strength of the catch belts or of the other construction components, as well as the transmission of force to the least possible extent.

Figures 3A, 3B:
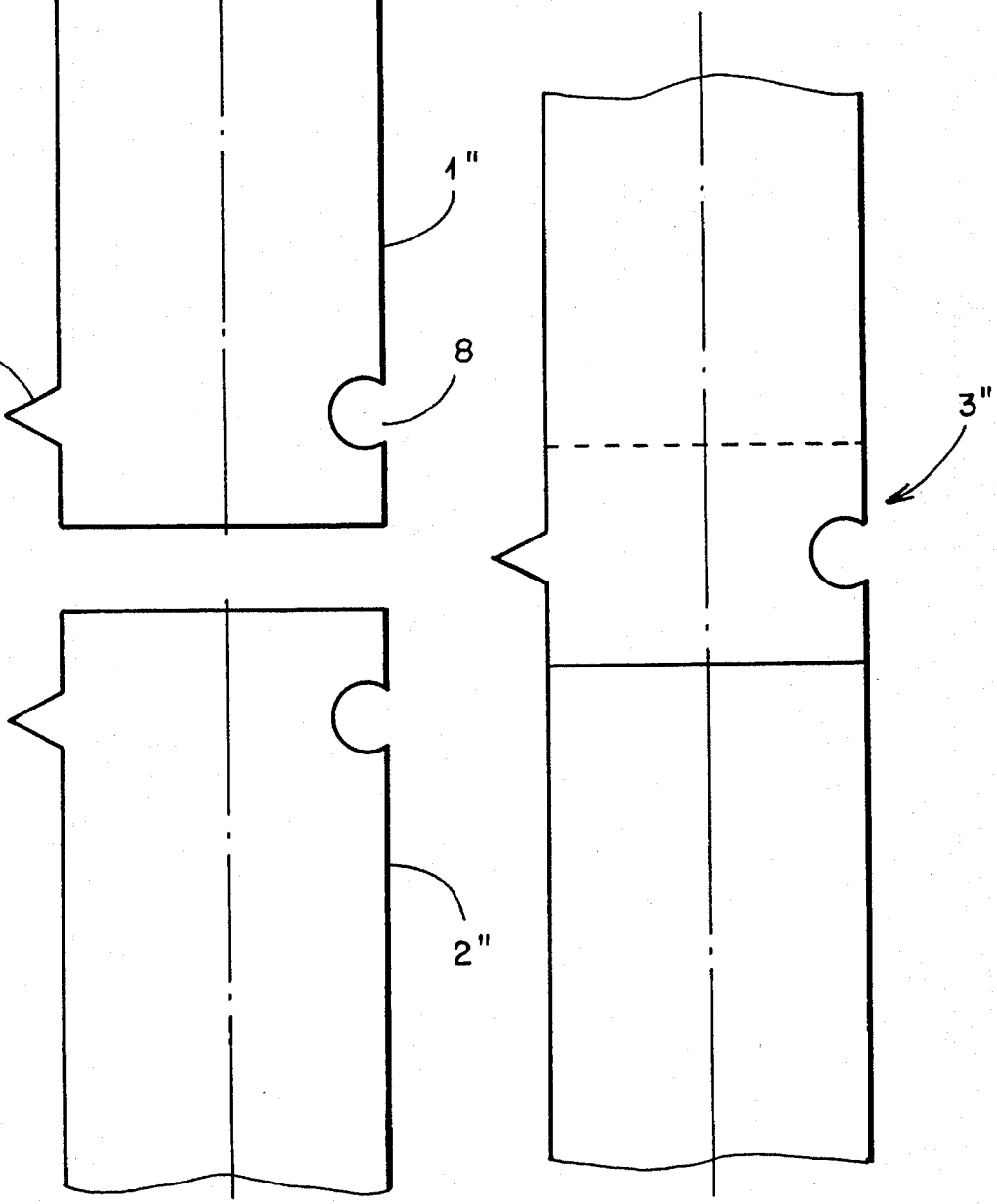
FIGS. 3a, b show a catch belt connection, with projections and recesses shown on its outer edges, whereby
Figure 4A:
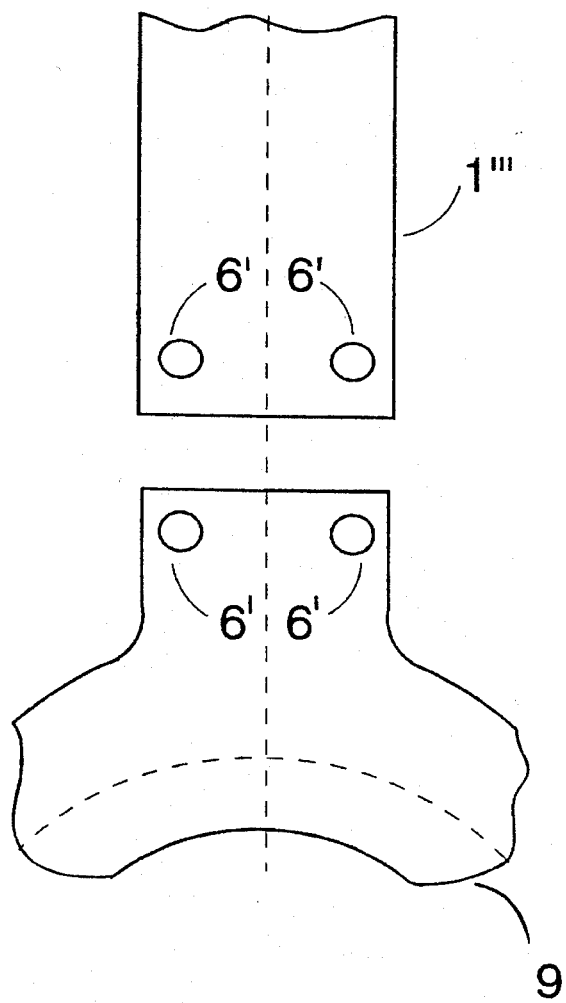
FIGS. 4a and 4b show a catch belt connection with a perforation, whereby
Figure 4B:
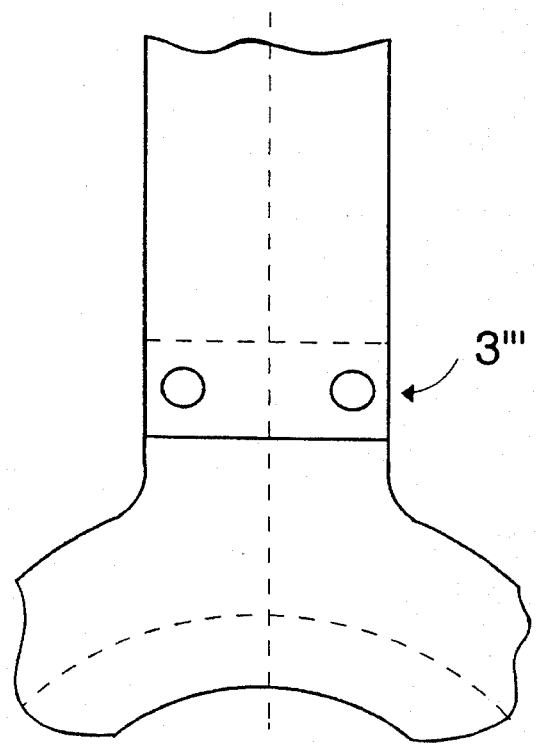
Figure 5A:
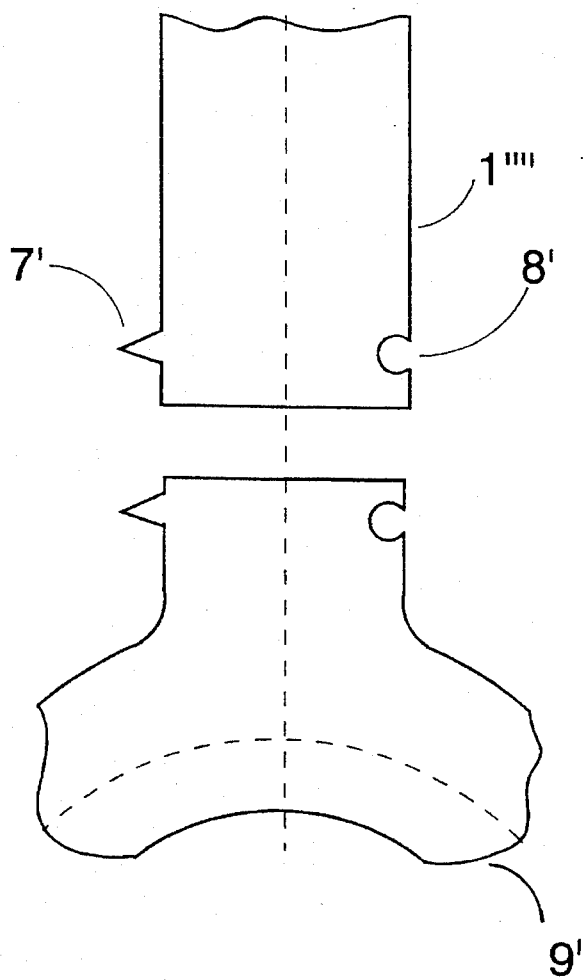
FIGS. 5a and 5b show a catch belt connection, with projections and recesses shown on its outer edges, whereby
Figure 5B:
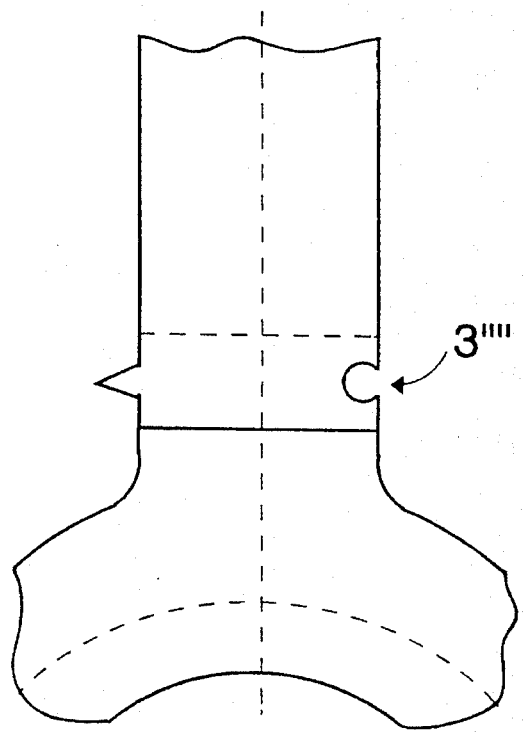

In a second embodiment of the collision protection device, in particular for occupants of vehicles, (see FIGS. 1 and 3a, 3b) particularly of motor vehicles, includes (a) a cushion or covering cap, an airbag, a fastening part, electronic or mechanical devices, and a gas generator, whereby (b) the airbag, the latter part being made of fabric with or without a coating, consists of a fastening part on the gas inflow side, said part being equipped with a fire protection, if need be; a top part (person impact side), and catch belts, whereby (c) the ends of the catch belts are connected with other construction components or with each other (joints), characterized in that (d) the catch belts (1, 1", 2, 2") or other construction components of the airbag have, on their outer edges, one or several projection(s) (7) or one or several recess(es) (8), namely within the zone of the joints (3, 3").

In this second embodiment of the collision protection device, the projections or recesses have round and/or polygonal shapes. In addition, the projections and/or the recesses are positioned and formed in a way such that they impair the strength of the catch belts or of the other construction components, as well as the transmission of force to the least possible extent.

FIGS. 4a, 4b and 5a, 5b are analogous to FIGS. 2a, 2b, and 3a, 3b, respectively, except that parts 9 or 9' for example represent a fire protection means which simultaneously forms the catch belt connection.

We claim:

1. Collision protection device for an occupant of a motor vehicle, comprising (a) an airbag;

(b) the airbag being made of fabric comprising a fastening part on a gas inflow side, said fastening part being equipped with a fire protection means, said airbag having, a top part occupant impact side, and having catch belts attached thereto;

(c) the catch belts having ends being connected with each other at joints; and (d) the catch belts each have, on outer edges thereof, at least one projection and at least one recess, and the projection on one catch belt overlapping the projection on a corresponding catch belt and the recess on one catch belt overlapping the recess on a corresponding catch belt to permit said ends to be connected at said joints; and (e) said recess being curved such that it impairs the strength of the catch belts, as well as the transmission of force, to the least possible extent.

2. Collision protection device according to claim 1, wherein the projections have round shapes.

3. Collision protection device according to claim 1, wherein the projections have polygonal shapes.

* * * * *